United States Patent
Donnet et al.

(10) Patent No.: US 12,478,573 B2
(45) Date of Patent: Nov. 25, 2025

(54) CYCLODEXTRINS AS DENTAL CLEANING POWDERS

(71) Applicant: FERTON HOLDING S.A., Delémont (CH)

(72) Inventors: Marcel Donnet, Saint Jean de Gonville (FR); Simone Gatti, Chavannes-près-Renens (CH); Qin Zhang, Zürich (CH)

(73) Assignee: FERTON HOLDING S.A., Delémont (CH)

( * ) Notice: Subject to any disclaimer, the term of this patent is extended or adjusted under 35 U.S.C. 154(b) by 564 days.

(21) Appl. No.: 17/798,173

(22) PCT Filed: Feb. 17, 2021

(86) PCT No.: PCT/EP2021/053908
§ 371 (c)(1),
(2) Date: Aug. 8, 2022

(87) PCT Pub. No.: WO2021/165332
PCT Pub. Date: Aug. 26, 2021

(65) Prior Publication Data
US 2023/0149284 A1 May 18, 2023

(30) Foreign Application Priority Data
Feb. 17, 2020 (EP) .................... 20157758

(51) Int. Cl.
*A61K 8/73* (2006.01)
*A61K 8/02* (2006.01)
*A61K 8/34* (2006.01)
*A61Q 11/00* (2006.01)

(52) U.S. Cl.
CPC ............ *A61K 8/738* (2013.01); *A61K 8/0225* (2013.01); *A61K 8/345* (2013.01); *A61Q 11/00* (2013.01); *A61K 2800/412* (2013.01); *A61K 2800/80* (2013.01)

(58) Field of Classification Search
CPC ...... A61K 8/738; A61K 8/0225; A61K 8/345; A61K 2800/412; A61K 2800/80; A61Q 11/00
USPC ......................................... 514/58
See application file for complete search history.

(56) References Cited

U.S. PATENT DOCUMENTS

| 2006/0182693 | A1 | 8/2006 | Kristiansen |
| 2006/0275223 | A1 | 12/2006 | Burr |
| 2007/0077210 | A1 | 4/2007 | Gebreselassie et al. |
| 2015/0125814 | A1 | 5/2015 | Haeberlein et al. |
| 2016/0030327 | A1* | 2/2016 | Stein ............... A61Q 19/00 424/54 |
| 2018/0015006 | A1 | 1/2018 | Donnet et al. |
| 2019/0099345 | A1* | 4/2019 | Metzger ............ A61K 9/0063 |

FOREIGN PATENT DOCUMENTS

| CN | 101690706 A | 4/2010 |
| DE | 20009665 U1 | 11/2001 |
| EP | 0850947 A1 | 1/1998 |
| EP | 2228175 A | 9/2010 |
| JP | 2000204354 A | 7/2000 |
| JP | 2010058187 A | 3/2010 |
| JP | 2017531690 A | 10/2017 |
| RU | 2400211 C1 | 9/2010 |
| RU | 2017140749 A | 5/2019 |
| WO | 2012053660 A1 | 4/2012 |
| WO | 2016124381 A1 | 8/2016 |
| WO | 2019001940 A1 | 1/2019 |

OTHER PUBLICATIONS

International Search Report for corresponding application PCT/EP2021/053908 filed Feb. 17, 2021; Mail date Mar. 19, 2021.
Written Opinion for corresponding application PCT/EP2021/053908 filed Feb. 17, 2021; Mail date Mar. 19, 2021.
International Preliminary Report on Patentability for corresponding application PCT/EP2021/053908 filed Feb. 17, 2021; Mail date Aug. 23, 2022.

* cited by examiner

*Primary Examiner* — Yih-Horng Shiao
(74) *Attorney, Agent, or Firm* — CANTOR COLBURN LLP

(57) ABSTRACT

The invention relates to the use of a powder in a powder jet device for cleaning tooth surfaces by powder spraying, wherein the powder comprises cyclodextrin. The invention also relates to a process for cleaning tooth surfaces with a powder jet device, wherein the powder comprises cyclodextrin and the invention relates to a powder or powder mixture for use in a powder jet device, wherein the powder or powder mixture comprises cyclodextrin.

15 Claims, 3 Drawing Sheets

CYCLODEXTRINS AS DENTAL CLEANING POWDERS

The present invention relates to the use of cyclodextrins as dental cleaning powder for cleaning tooth surfaces by powder spraying. The invention further relates to a process for cleaning teeth by using cyclodextrin powders in a powder jet device.

Tooth cleaning as part of professional dental prophylaxis is a maintenance treatment comprising powder jet cleaning or air polishing and aims to remove dental plaque and calculus that a patient is not able to remove during daily home care. The method is particularly effective since it allows to reach and clean all teeth surfaces and the interspaces between teeth as well as implants, brackets and appliances.

In the process of powder jet cleaning, a powder is sprayed together with a gaseous carrier medium onto tooth surfaces, thereby achieving an efficient cleaning. Additionally or as an alternative to the gaseous carrier medium, which is usually air, a liquid carrier medium, for example water, may be used. Powder jet cleaning is performed with a powder jet device and it is particularly effective since it does not require repetitive movements nor different stages. Further, it is faster than other cleaning methods and it needs relatively low training to be learned correctly. The cleaning occurs without damaging enamel dentine and soft tissues as long as the powder is sufficiently soft and the particles are sufficiently small.

A dental cleaning powder containing a basic powder of sodium bicarbonate (sodium hydrogencarbonate) is described in DE 200 09 665 U1. Calcium carbonate or glycine can also be used and the powder may comprise additional active ingredients such as anti-microbial compounds or ingredients which contribute to the rem ineralisation of the teeth.

A powder for use in a powder jet device based on alditols, in particular mannitol and/or erythritol is described in EP 2 228 175 A1.

EP 3 253 359 A1 discloses that particles of dental cleaning powders should have an average particle size of around 10-100 µm for gentle and nevertheless efficient tooth cleaning. Small particles sizes are preferred for cleaning subgingival tooth surfaces and larger particle sizes are preferred for cleaning the supragingival tooth surfaces. Larger particle sizes usually result in discomfort or pain when subgingival tooth surfaces or soft tissues as gum are hit.

The hardness and the abrasiveness of the powders are important features of powders for use in dental cleaning. If the powder is too hard and abrasive, it may damage the enamel and the composites used for dental reparation. Therefore, soft materials such as sodium bicarbonate are often used in powder jet devices. However, even with this material, patients sometimes feel discomfort and there is a risk of damaging soft tissues such as dentine and gingiva so that this technique is usually only used supragingival.

Powders for subgingival treatment are for example the product PERIO from EMS (Electro Medical Systems GmbH) which is based on glycine. Such glycine powders are less abrasive and thus safer and more comfortable for patients even when used on soft tissues such as gingiva and exposed dentine. However, a high decrease in cleaning efficiency is usually experienced, compared with the more abrasive bicarbonate powders so that a higher amount of time and powder consumption is needed for the same treatment result.

A further powder that has been developed is the product PLUS from EMS, based on erythritol, which is a material harder than glycine but softer than bicarbonate. The erythritol powder PLUS is more efficient in powder jet cleaning than glycine and thus a lower time and lower amount of powder is required to perform a treatment. However, the abrasiveness is again slightly enhanced.

In view of the above there is still a need for dental cleaning powders with low abrasiveness and still high cleaning efficiency.

Accordingly, it is an object of the present invention to provide a powder for use in a powder jet device for cleaning tooth surfaces that overcomes the aforementioned disadvantages of conventional powders, in particular a powder with low abrasiveness and high cleaning efficiency.

According to the invention, this object is achieved by the use of a powder in a powder jet device for cleaning tooth surfaces by powder spraying, wherein the powder comprises one or more cyclodextrins. The object is further achieved by a process for cleaning tooth surfaces, wherein a powder comprising cyclodextrin is sprayed with a powder jet device onto a tooth surface together with a gaseous and/or liquid carrier medium. The object is also achieved by a powder for use in a powder jet device for cleaning tooth surfaces by powder spraying, wherein the powder comprises cyclodextrin.

Preferred embodiments of the invention are subject to the dependent claims as well as the following description.

It has surprisingly been found that cyclodextrin powders provide a lower abrasiveness than the common commercially available dental cleaning powders based on sodium bicarbonate, erythritol, glycine, tagatose or trehalose and still a high cleaning efficiency. Even more, using cyclodextrin in combinations or mixture with these commercial powders allows also to reduce significantly the abrasivity, even using this material at lower concentration.

Within the meaning of the invention, cleaning tooth surfaces is the partial or complete removal of dental plaque and/or calculus from tooth surfaces. The cleaning is performed with conventional powder jet devices for cleaning teeth by powder spraying as described above.

Cyclodextrins are known and the cyclodextrin according to the invention can be α-cyclodextrin, comprising six glucose molecules, β-cyclodextrin, comprising seven glucose molecules, γ-cyclodextrin, comprising eight glucose molecules or δ-cyclodextrin, comprising nine glucose molecules. The cyclodextrin is preferably α-cyclodextrin, β-cyclodextrin or γ-cyclodextrin. The compounds are shown below.

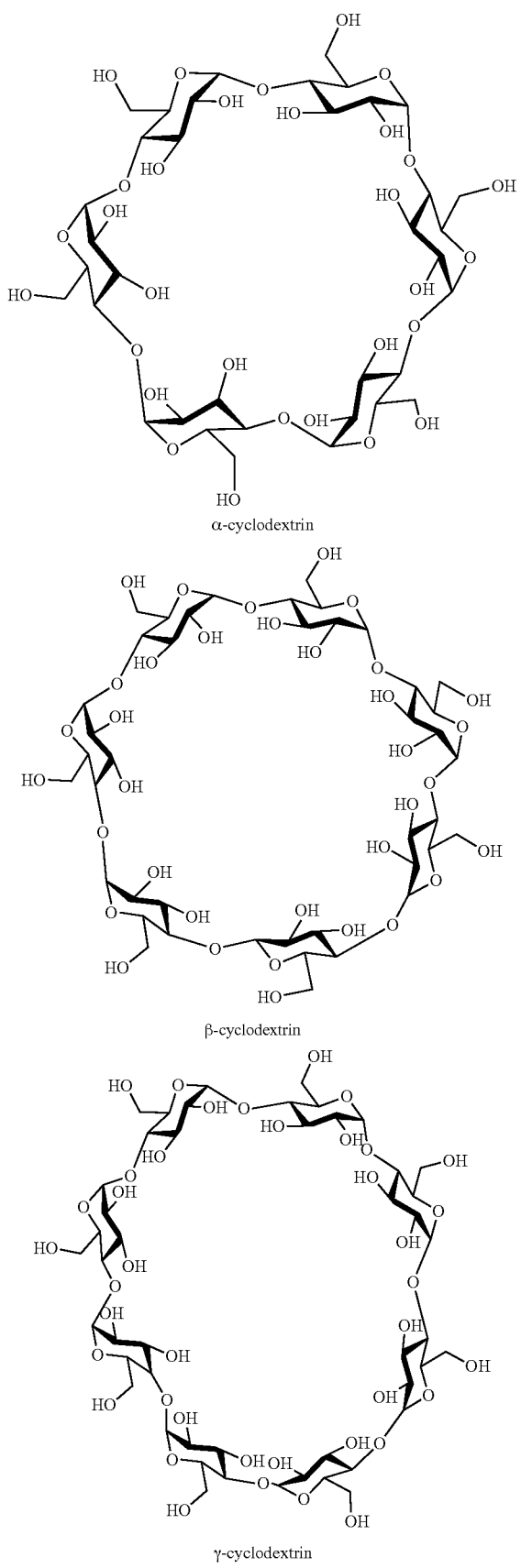

α-cyclodextrin

β-cyclodextrin

γ-cyclodextrin

In a preferred embodiment of the invention, the cyclodextrin is α-cyclodextrin or β-cyclodextrin, more preferably α-cyclodextrin.

The maximum particle size of the powder according to the invention ($d_{100}$) is preferably equal or less than 200 µm, more preferably ≤150 µm, even more preferably 120 µm and most preferably ≤100 µm in order to obtain an efficient tooth cleaning. The average particle size ($d_{50}$) is preferably 5 to 75 µm, in particular 10 to 70 µm. The particle sizes may be adapted to the field of application of dental cleaning that is provided. For example, a smaller average particle size of the particles is preferred for cleaning subgingival tooth surfaces, in particular about 5 to 40 µm, more preferably 10 to 30 µm. For cleaning supragingival tooth surfaces, a larger average particle size is preferred, in particular about 20 to 75 µm, more preferably 30 to 60 µm.

According to the invention, the $d_{50}$ value is the particle size at which 50% of the particles are smaller than the $d_{50}$ value in terms of volume and 50% of the particles are larger than the $d_{50}$ value in terms of volume. This applies also to $d_{10}$, $d_{90}$ and $d_{100}$ values. The maximum particle size is the $d_{100}$ value, where 100% of the particles in terms of volume are smaller than this value. A powder with a certain maximum particle size can be prepared by sieving the powder with a sieve having an appropriate mesh size. The $d_{100}$ value can afterwards also be determined by laser diffraction measurement.

The d-values according to the invention are determined by laser diffraction using a dry dispersion unit (Malvern Mastersizer 2000, equipped with a Scirocco dry dispersion unit, operated at 1.5 bar). The measurement method is further described in the examples.

In a preferred embodiment of the invention, the powder comprising cyclodextrin additionally comprises a flow aid, a bleaching agent, a bactericide, an analgesic and/or a flavouring agent. The total amount of these additional substances is preferably 0.03 to 5 wt.-%, based on the total weight of the powder, more preferably 0.05 to 3 wt.-%, most preferably 0.05 to 2 wt.-%.

According to a preferred embodiment of the invention, the powder comprises a flow aid, in particular a flow aid selected from the group consisting of silicon dioxide (silica), aluminium silicate and/or aluminium hydroxide. Silicon dioxide is most preferred, in particular in an amount of 0.5 to 2 wt.-%, based on the total weight of the powder.

The powder according to the invention comprises preferably at least 10 wt.-% cyclodextrin, more preferably at least 20 wt.-% cyclodextrin, even more preferably at least 50 wt.-% cyclodextrin, most preferably at least 60 wt.-% cyclodextrin, in particular 95 to 99.5 wt.-% cyclodextrin.

Within the meaning of the present invention it should be understood that the amounts of the components of the powder, given in wt.-% (weight-%), sum up to 100%. By way of example, a powder comprising 2 wt.-% amorphous silicon dioxide contains other components in a total amount of 98 wt.-%.

It is also preferred that the advantageous abrasiveness and efficiency of cyclodextrin is combined with additional cleaning powders, in particular glycine, sodium hydrogen carbonate, monosaccharides, preferably tagatose, disaccharides, preferably trehalose and/or alditols, preferably erythritol. The additional cleaning powders that can be combined with cyclodextrin can be one or more commercially available cleaning powders. The additional cleaning powder is preferably one or more selected from the group consisting of a powder based on erythritol, a powder based on sodium bicarbonate and a powder based on glycine.

A preferred powder of the invention comprises 10 to 80 wt.-% cyclodextrin and 90 to 20 wt.-% glycine, sodium hydrogen carbonate and/or an alditol, preferably erythritol. More preferred are powder mixtures comprising 20 to 70 wt-.% cyclodextrin and 80 to 30 wt.-% glycine, sodium hydrogen carbonate and/or an alditol, preferably erythritol. Mixtures of cyclodextrins with erythritol are particularly preferred as these two substances have very similar densities which avoid any de-mixing issues. The powder composition can additionally comprise other components as described herein, for example a flow aid, a bactericide, a bleaching agent and/or an analgesic. The alditol is preferably selected from the group consisting of erythritol, sorbitol, xylit (xylitol), mannit (mannitol), lactitol, threit (threitol), arabitol, and isomalt. Preferred bleaching agents are peroxides such as magnesium, calcium or zinc peroxides, persulfates such as sodium, potassium or ammonium persulfates or perborates. Bactericides are preferably chlorhexidine, chlorhexidine digluconate, triclosan, cetylpyridinium chloride, hexetidine, tin(II) salts and zinc salts. Preferred analgesics are lidocaine and articaine.

A further embodiment of the invention is a powder (dental cleaning powder) for use in a powder jet device for cleaning a tooth surface by powder spraying, wherein the powder comprises granules having an average particle size (average granule size) of 20 μm to 220 μm, and wherein the granules comprise primary particles and a binder, the primary particles having an average particle size that is smaller than the average particle size of the granules, wherein the binder comprises cyclodextrin.

The use of the powder according to the invention in a powder jet cleaning device for cleaning a tooth surface by powder spraying is also an embodiment of the invention.

This embodiment combines advantages of two opposite effects, namely the advantageous effects of large and small particles. This is achieved by binding small particles (herein called primary particles) to larger particles (herein called granules). The granules are present during handling before the cleaning process starts, i.e. during filling the powder bottles in the powder production and filling up the powder jet device for teeth cleaning, whereas the primary particles or at least fragments of the granules are formed in or in the vicinity of the nozzle of the powder jet device or when the granules fly towards or hit the tooth surface by fragmentation of the granules. As a result, the cleaning effect, particularly the abrasivity, corresponds to the primary particles (small particles) and the handling corresponds to the granules (large particles).

The abrasivity of the powders according to this embodiment is even lower than the abrasivity of the primary particles alone. Without being bound by this explanation, it is assumed that this positive effect is achieved by the binder cyclodextrin which has per se a low abrasivity and that is sufficiently soft to allow breaking of the granules into particles and that is still present at parts of the particle surfaces that are responsible for the abrasivity and the cleaning effect.

The granules preferably have an average particle size (average granule size $d_{50,g}$) of 20 μm to 180 μm, more preferably of 20 μm to 150 μm, even more preferably of 20 μm to 100 μm and most preferably of 20 μm to 600 μm. Granules in this size range allow an efficient dust-free handling and avoid problems resulting from a slow compaction of powders consisting of fine particles.

For a gentle and nevertheless efficient tooth cleaning, the primary particles, forming the granules together with the binder, preferably have an average particle size ($d_{50,p}$) of 5 μm to 75 μm, more preferably 10 μm to 70 μm. The particle sizes may be adapted to the field of application of the dental cleaning powder that is provided. For example, a smaller average particle size of the primary particles is preferred for cleaning subgingival tooth surfaces, in particular approximately 5 μm to 40 μm, preferably 10 μm to 30 μm. For tooth cleaning of the supragingival tooth surfaces, a larger average particle size of the primary particles is preferred, in particular approximately 20 μm to 75 μm, more preferably 30 μm to 50 μm.

The binder comprises cyclodextrin and binds the primary particles within the granules. Preferably, the binder comprises at least 50 wt.-% cyclodextrin, more preferably at least 75 wt.-% cyclodextrin and most preferably more than 95 wt.-% cyclodextrin. In the preferred embodiment of the invention, the binder further comprises a dietary fibre, a polysaccharide, a synthetic polymer, a salt, a sugar, an alditol, an amino acid, the same material as the material of the primary particles, or mixtures thereof. They allow a soft binding of the particles so that an efficient breakage or fragmentation of the granules into smaller fragments is possible in usual powder jet devices for tooth cleaning. The preferred cyclodextrines of the invention are also the preferred cyclodextrines in the binder. Preferably, the cyclodextrin in the binder is α-, β- or γ-cyclodextrin, more preferably α-cyclodextrin or β-cyclodextrin.

The fragmentation of the granules is usually a partial fragmentation, wherein preferably 50 to 99.9% of the granules break into fragments in the nozzle of powder jet devices and/or when the powder hits the tooth surface (50 to 99.9% fragmentation). A fragmentation of 90 to 99.9% is more preferred. For measuring the corresponding size reduction after fragmentation there are two possibilities. To measure the size reduction between two different dispersing pressures in a laser diffraction unit such as Malvern Mastersizer with Scirocco unit or to measure the size reduction of the powder after passing through the nozzle of a powder jet device (air-polishing device) such as EMS Airflow® prophylaxis master. The details are described in the experimental section.

In a preferred embodiment of the invention, the binder consists of cyclodextrin. In a further preferred embodiment, the material of the binder comprises cyclodextrin and one or more selected from the group consisting of cellulose, hemicellulose, cellulose derivatives, maltodextrins, corn dextrins, xanthan gum, guar gum and gum arabic. A trade name of a preferred corn dextrin is Nutriose®. These binders provide a soft binding that gives an efficient fragmentation in the powder jet device, in particular in the nozzle and/or when the granules and their potential fragments hit the tooth surface.

The powder according to the invention can be prepared by a process comprising the steps that a binder is mixed with water, the resulting mixture is sprayed on the primary particles and the particles are dried to form granules. Preferably, the powder is prepared by using a fluidized bed granulator. The binder is mixed with water, sprayed onto a powder fluidized bed and dried. The drying can be conducted at room temperature or elevated temperature. The liquid addition rate and the temperature are chosen so that the binding solution falls on the primary particles and dries out, gluing the primary particles together to form the granules. Granulation parameters are optimized according to the specific binder solution.

In view of the fact that there is a partial fragmentation of the granules, the average particle size of the powder after fragmentation in the nozzle and/or on the tooth surface is lower than the average particle size of the granules. The average particle size of the powder after breaking or fragmentation ($d_{50,p-b}$) depends on the fragmentation degree and the particle size of additional components in the powder.

The powder after fragmentation or breakage of the granules preferably has an average particle size $d_{50,p-b}$ of 5 µm to 75 µm, in particular 10 µm to 70 µm. Preferred size ranges depend on the field of application of the dental cleaning powder that is provided. Smaller average particle sizes are preferred for cleaning subgingival tooth surfaces, and larger average particle sizes are preferred for cleaning supragingival tooth surfaces. The powder for cleaning subgingival tooth surfaces preferably has an average particle size of 5 µm to 40 µm after fragmentation, more preferably 10 µm to 30 µm. The powder for cleaning supragingival tooth surfaces after fragmentation preferably has an average particle size of 20 µm to 75 µm, more preferably 30 µm to 50 µm.

The granules comprise preferably 80-99.5% by weight of the particles and 0.5-20% by weight of the binder, in particular 90-99.5% by weight of the particles and 0.5-10% by weight of the binder. Regarding the amount of cyclodextrin, it is preferred for the powder comprising granules that the powder comprises less than 20 wt.-% cyclodextrin, more preferably less than 15 wt.-% cyclodextrin and most preferably less than 10 wt.-% cyclodextrin. In a preferred embodiment of the invention, the powder comprises 1 to 20 wt.-% cyclodextrin as a binder and 99 to 80 wt. % glycine, sodium hydrogen carbonate, tagatose, trehalose and/or alditols, preferably erythritol.

The particles are made of substances suitable for dental cleaning purposes. Suitable materials are chosen depending on the field of application of the dental cleaning powder, for example powder for cleaning supragingival tooth surfaces or cleaning subgingival tooth surfaces. Preferred are soluble salts, alditols, amino acids and sugars. Soluble salts can be organic or inorganic salts, in particular sodium hydrogen carbonate, alditols can be mannitol or erythritol, amino acids can be glycine and sugars can be trehalose or tagatose, cyclodextrin can be alpha- or beta-cyclodextrin. According to one embodiment of the invention, the particles are not made of calcium carbonate. The material of the particles of the powder according to invention is more preferably one or more selected from the group consisting of mannitol, erythritol, glycine, trehalose, tagatose, cyclodextrin and sodium hydrogen carbonate. These substances in the form of powders provide moderate abrasivity for an effective cleaning without destroying the tooth surface.

The primary particles preferably contain at least 80 weight-%, more preferably at least 90 weight-% of the above-mentioned substances, for example sodium hydrogen carbonate, alditols, mannitol, erythritol, glycine, trehalose, tagatose or mixtures thereof. In a further preferred embodiment of the invention, the binder and the primary particles are made of the same material, which means that the primary particles and the binder both comprise cyclodextrin.

It is also preferred that the powder for use in a powder jet device according to the invention consists of the described components. By way of example, a preferred powder consists of 9.5-89.5 wt.-% cyclodextrin, 90 to 10 wt.-% erythritol, and 0.5-2 wt.-% of a flow aid, in particular 0.5-2 wt.-% amorphous silicon dioxide, and optionally a bactericide, a bleaching agent and/or an analgesic.

The invention also relates to a powder or powder mixture for use in a powder jet device for cleaning tooth surfaces by powder spraying. The preferred embodiments of the use described herein are also preferred for the powder or powder mixture.

Each preferred, more and most preferred use embodiment described herein is also applicable to the powders that comprise cyclodextrin.

The invention further relates to a process for cleaning tooth surfaces wherein the powder according to the invention is sprayed with a powder jet device onto the tooth surfaces together with a gaseous carrier medium and/or a liquid carrier medium, in particular air and optionally a fluid such as water.

The following examples provide preferred embodiments according to the invention.

EXAMPLES

Example 1: α-Cyclodextrin

α-cyclodextrin was grinded and sieved at 120 µm, so that $d_{100}$ was ≤120 µm. The powder was mixed with about 2 wt.-% amorphous silicon dioxide (silica). The average particle size of this powder was 30 µm.

Example 2: β-Cyclodextrin

β-cyclodextrin was grinded and sieved at 120 µm, so that $d_{100}$ was ≤120 µm. The powder was mixed with about 2 wt.-% amorphous silicon dioxide (silica). The average particle size $d_{50}$ of this powder was 20 µm.

The two powders according to Example 1 and Example 2 were tested regarding cleaning efficiency and abrasiveness. The results are shown in FIGS. 1 to 3 in comparison to known cleaning powders.

The abrasiveness is measured by projecting powder with a powder jet device directly on a surface at 45° and 2 mm of projected distance using an EMS Airflow® prophylaxis master device. This surface is made of pure aluminium (99.5%). The application time is 30 seconds. The plate is put on an elevator to reach the distance of 2 mm. The nozzle is fixed in a resin mould in order to fix well the nozzle position. The mass is known by weighing the powder chamber before and after the test. Every measurement is repeated at least three times and the average is taken as abrasiveness. The depth of the holes was measured by a laser profilometer. The efficiency or cleaning efficiency is the surface that is cleaned per gram of the powder.

The average particle size ($d_{50}$) of the powders according to the invention is determined with a Malvern Mastersizer 2000 (Malvern Instruments Ltd., Malvern, UK) with a Scirocco Dispersing Unit at a dispersion pressure of 1.5 bar.

Example 3: Erythritol Granulated with α-Cyclodextrin

The experiment was carried out in a pilot batch fluidized bed of conical shape. Initial particle mass 1 kg, inlet air temperature 60-90° C., liquid feed rate 5-20 ml min$^{-1}$ and relative air spraying pressure 1-2.5 bar were chosen as process parameters. A solution of α-cyclodextrin was sprayed for 20 min. During the experiment, all process parameters (air inlet temperature, air flow rate, liquid feed rate and spraying pressure) were kept constant. At the end of the experiment the granulated powder was removed and the solid content checked to be more than 98%. The amount of α-cyclodextrin added to the powder was between 5-10%.

The invention is described further below with reference to FIGS. 1 to 3.

Figure 1:
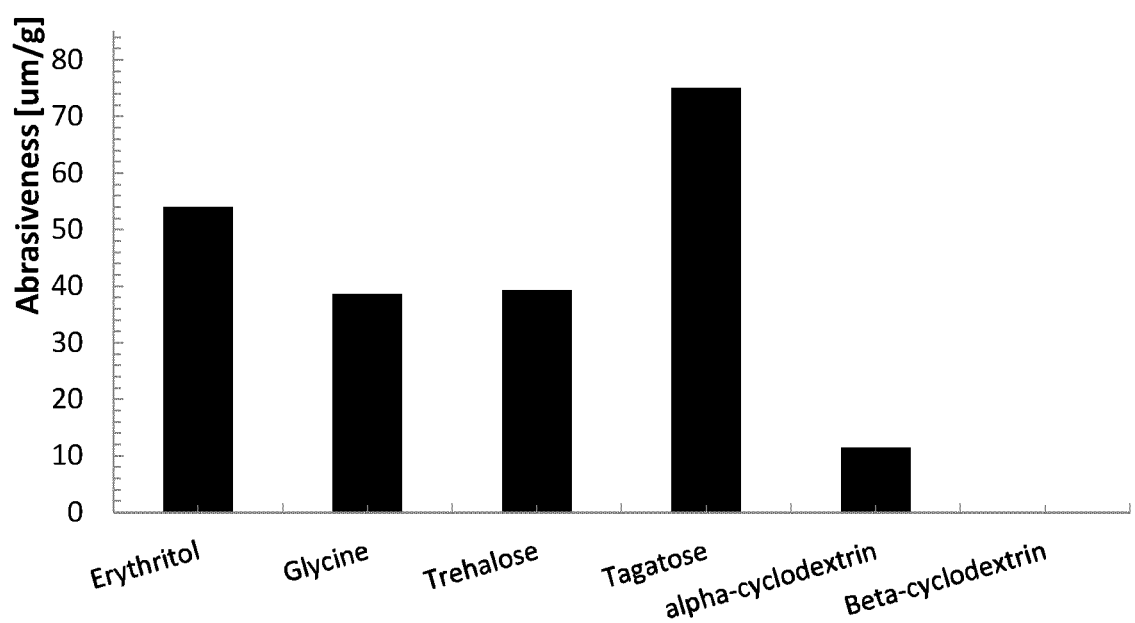
FIG. 1 shows the abrasiveness [μm/g] of the α-cyclodextrin and β-cyclodextrin powder according to Example 1 compared to powders of erythritol, glycine, trehalose and tagatose.
Figure 2:
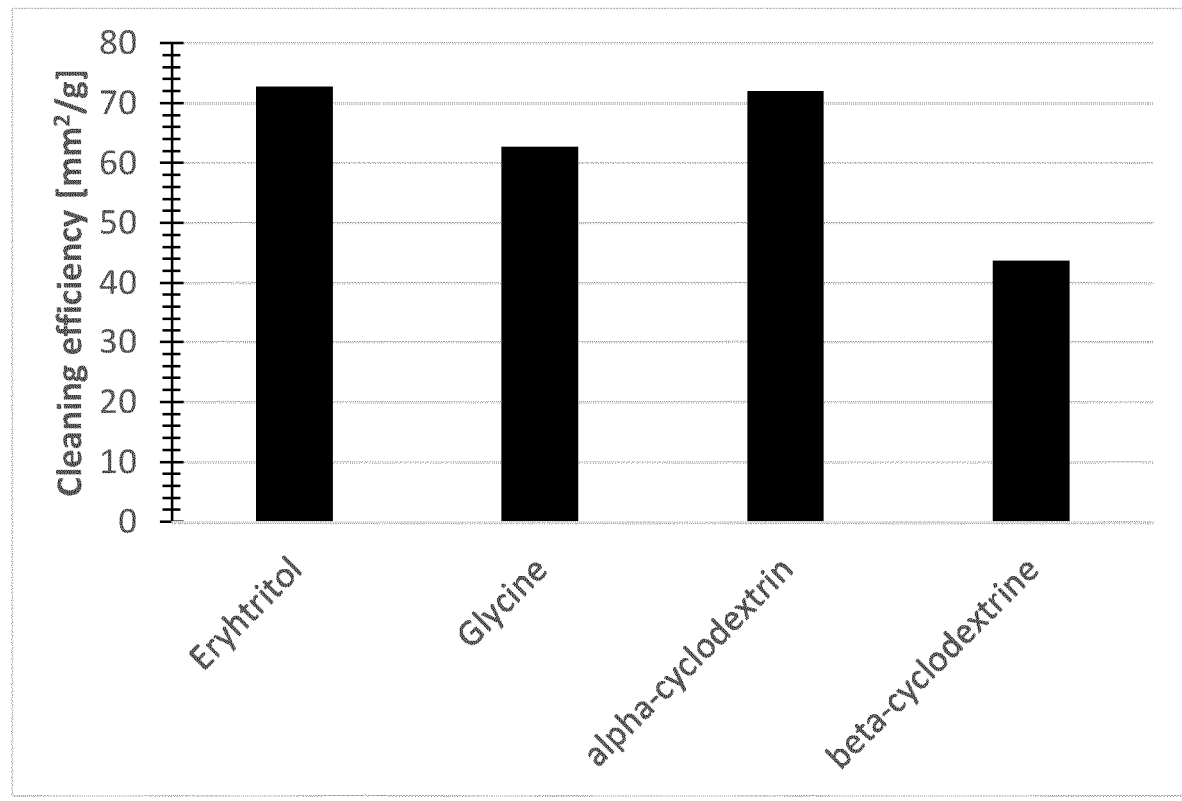
FIG. 2 shows the cleaning efficiency [mm²/g] of α-cyclodextrin and β-cyclodextrin compared to powders of erythritol and glycine.
Figure 3:
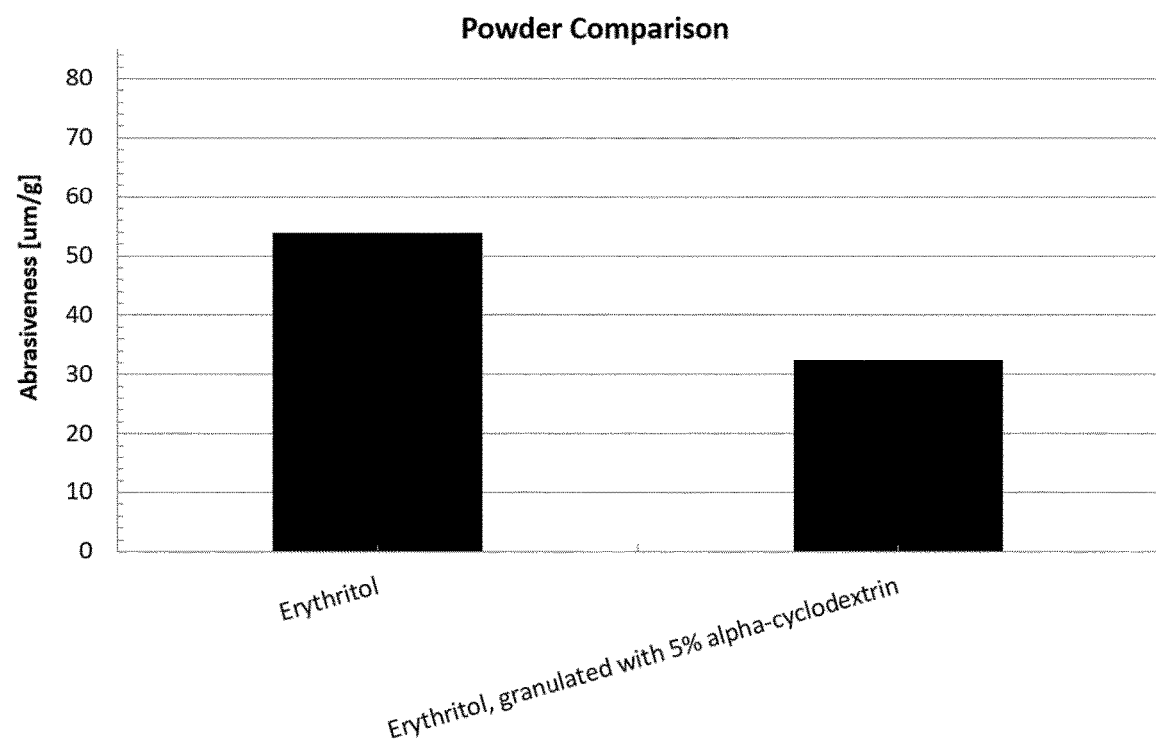
FIG. 3 shows the abrasiveness [μm/g] of erythritol powder granulated with the α-cyclodextrin as a binder. The comparison is between the initial powder of Erythritol and the granulated powder.

The above examples demonstrate that the powders according to invention comprising cyclodextrins have a reduced abrasiveness and still a high cleaning efficiency compared to commercially available dental cleaning powders.

The invention claimed is:

1. A powder, comprising:
   10 to 80 wt.-% cyclodextrin; and
   90 to 20 wt.-% glycine, sodium hydrogen carbonate and/or an alditol;
   wherein the powder is configured to be used in a powder jet device for cleaning tooth surfaces by powder spraying and the cyclodextrin is prepared to have a lower abrasiveness than glycine and erythritol.

2. The powder according to claim 1, wherein the cyclodextrin is α-cyclodextrin, β-cyclodextrin, γ-cyclodextrin or mixtures thereof.

3. The powder according to claim 1, wherein the powder further comprises 0.5 to 3 wt.-% amorphous silicon dioxide.

4. The powder according to claim 1, wherein the average particle size of the powder is 5 to 75 μm.

5. The powder according to claim 1, wherein the maximum particle size of the powder is 200 μm.

6. The powder according to claim 1, wherein the powder further comprises a bac-tericide, a bleaching agent or an analgesic.

7. The powder according to claim 1, wherein the powder comprises 10 to 80 wt.-% cyclodextrin and 90 to 20 wt. % glycine, sodium hydrogen carbonate, tagatose, trehalose and/or alditols.

8. The powder according to claim 1, wherein the powder comprises granules having an average particle size of 20 μm to 220 μm, wherein the granules comprise primary particles comprising a binder, wherein the primary particles have an average particle size smaller than the average particle size of the granules and wherein the binder comprises cyclodextrin.

9. A process for cleaning tooth surfaces, wherein a powder according to claim 1 is sprayed with a powder jet device onto a tooth surface together with a gaseous or liquid carrier medium.

10. Powder according to claim 1, wherein the alditol is erythritol.

11. Powder according to claim 2, wherein the alditol is erythritol.

12. Powder according to claim 3, wherein the alditol is erythritol.

13. Powder according to claim 7, wherein the alditol is erythritol.

14. Powder according to claim 4, wherein the alditol is erythritol.

15. Powder according to claim 5, wherein the alditol is erythritol.

* * * * *